(12) United States Patent
Kim

(10) Patent No.: US 9,125,513 B2
(45) Date of Patent: Sep. 8, 2015

(54) HANDLE-INTERLOCKING AIRTIGHT BOILING POT

(71) Applicant: Woo Hyeop Kim, Seoul (KR)

(72) Inventor: Woo Hyeop Kim, Seoul (KR)

( * ) Notice: Subject to any disclaimer, the term of this patent is extended or adjusted under 35 U.S.C. 154(b) by 0 days.

(21) Appl. No.: 14/396,914

(22) PCT Filed: May 2, 2013

(86) PCT No.: PCT/KR2013/003792
§ 371 (c)(1),
(2) Date: Oct. 24, 2014

(87) PCT Pub. No.: WO2013/165182
PCT Pub. Date: Nov. 7, 2013

(65) Prior Publication Data
US 2015/0053695 A1    Feb. 26, 2015

(30) Foreign Application Priority Data

May 3, 2012  (KR) .................... 20-2012-0003641 U
Jun. 20, 2012 (KR) ......................... 10-2012-0066159

(51) Int. Cl.
*A47J 27/08* (2006.01)
*A47J 45/06* (2006.01)
*A47J 36/10* (2006.01)

(52) U.S. Cl.
CPC ............. *A47J 27/0811* (2013.01); *A47J 36/10* (2013.01); *A47J 45/06* (2013.01); *A47J 45/062* (2013.01)

(58) Field of Classification Search
CPC ..... A47J 45/062; A47J 45/06; A47J 27/0811; A47J 27/0804; A47J 27/09; A47J 27/08; A47J 36/10; B65D 43/0212; B65D 43/0218; B65D 45/22; B65D 45/20; B65D 45/24; E05C 19/14
See application file for complete search history.

(56) References Cited

FOREIGN PATENT DOCUMENTS

| JP | 09084697 | 3/1997 |
| JP | 2001340212 | 12/2001 |
| KR | 2019980006527 | 4/1998 |
| KR | 200439944 | 5/2008 |

OTHER PUBLICATIONS

International Search Report—PCT/KR2013/003792 dated Aug. 5, 2013.

*Primary Examiner* — Andrew Perreault
(74) *Attorney, Agent, or Firm* — Cantor Colburn LLP

(57) ABSTRACT

A handle-interlocking airtight boiling pot includes: a rotational body which is rotatably supported at the side of the container and is mounted to rotate between a lid opening position and a lid closing position; a hand grip part formed at an upper end of the rotational body; and an airtightly fixing part which is formed integrally with a lower part of the hand grip part and protrudes toward the lid to airtightly fix the lid to the container by pressing an upper side of the lid when the rotational body is located at the lid closing position. The lid includes: a retaining protrusion formed at an upper side of an edge portion of the lid to catch and retain the airtightly fixing part of the rotational body at the lid closing position; and a contact groove part with which a contact surface of the airtightly fixing part gets in contact.

4 Claims, 5 Drawing Sheets

HANDLE-INTERLOCKING AIRTIGHT BOILING POT

TECHNICAL FIELD

The present invention relates to a handle-interlocking airtight boiling pot, and more particularly, to a handle-interlocking airtight boiling pot which can airtightly fix or release a lid to or from a container and simultaneously open or close an air hole formed at the lid by moving a container handle between a lid opening position and a lid closing position.

BACKGROUND ART

In general, a pot is used to heat foods, and includes: a container of which upper side is opened; a lid to open and close the container; container handle formed at both sides of the container to grip the container to carry the pot; and a lid knob formed at the center of the lid to open and close the lid.

Moreover, in case of a conventional pot, when food is stored in a pot, outside air may be introduced into the pot through a gap between the container and the lid to spoil the food. Therefore, in order to prevent food from being soiled by the outside air introduced into the pot, lid sealing means is provided to airtightly fix the container and the lid by interposing a packing between the container and the lid. However, the lid sealing means is disposed irrespective of the container handle, the pot is complicated in structure and raises manufacturing costs due to an increase of manufacturing steps.

Furthermore, the conventional pot has an air hole formed in the lid to prevent that the lid is opened by steam pressure generated from the inside of the pot when food is heated. However, the conventional pot has several disadvantages in that food may be spoiled due to the outside air introduced into the pot through the air hole when food is stored in the pot, and in that inside air of the pot is discharged out through the air hole to cause a food smell to the inside of a refrigerator when the pot which contains food therein is stored in the refrigerator.

In order to solve the above problems, automatically air hole opening and closing means is provided to automatically open the air hole only when steam pressure is generated inside the pot during cooking and to usually block a flow of the air by closing the air hole, but the automatically air hole opening and closing means also has several disadvantages in that the structure of the lid is complicated and raises manufacturing costs due to an increase of manufacturing steps.

DISCLOSURE

Technical Problem

Accordingly, the present invention has been made in an effort to solve the above-mentioned problems occurring in the prior arts, and it is an object of the present invention to provide a handle-interlocking airtight boiling pot in which lid sealing means for airtightly sealing and fixing a lid and a container is formed integrally with a container handle and can airtightly fix or release the lid to or from the container by moving the container handle between a lid opening position and a lid closing position, thereby providing user convenience, simplifying the configuration of the container, and saving on manufacturing costs by reducing the manufacturing steps.

Moreover, it is another object of the present invention to provide a handle-interlocking airtight boiling pot in which one can airtightly fix or release a lid to or from a container and simultaneously open or close an air hole formed at the lid by moving a container handle between a lid opening position and a lid closing position, thereby providing user convenience, simplifying the configuration of the container, and saving on manufacturing costs by reducing the manufacturing steps.

Technical Solution

To achieve the above objects, the present invention provides a handle-interlocking airtight boiling pot which includes: a container of which upper part is opened; a lid for opening and closing an upper part of the container; container handles disposed at both sides of the container; and a lid knob disposed at the lid, characterized in that the container handle includes: a rotational body which is rotatably supported at a lateral side of the container and is mounted to rotate between a lid opening position and a lid closing position; a hand grip part formed at an upper end of the rotational body; and an airtightly fixing part which is formed integrally with a lower part of the hand grip part and protrudes toward the lid to airtightly fix the lid to the container by pressing an upper side of the lid when the rotational body is located at the lid closing position, and the lid includes: a retaining protrusion formed at an upper side of an edge portion of the lid to catch and retain the airtightly fixing part of the rotational body at the lid closing position; and a contact groove part with which a contact surface of the airtightly fixing part gets in contact.

Moreover, the handle-interlocking airtight boiling pot further includes a stopper part which is formed integrally with a lower part of the rotational body to restrict the lid opening position of the rotational body by getting in contact with the side of the container at the lid opening position.

Furthermore, an air hole to be communicated with the inside of the container can be formed in the contact groove part of the lid with which the airtightly fixing part of the rotational body gets in contact at the lid closing position and is closed by the contact surface of the airtightly fixing part at the lid closing position.

Additionally, a packing which gets in contact with the contact surface of the airtightly fixing part is fit and mounted at an upper end of the air hole of the lid.

Advantageous Effects

The handle-interlocking airtight boiling pot according to the present invention can airtightly fix the lid to the container in convenience because the airtightly fixing part formed integrally with the rotational body is retained to the retaining protrusion of the lid and gets in contact with the contact groove part of the lid at the same time just by rotating the rotational body of the container handle from the lid opening position to the lid closing position. Therefore, the handle-interlocking airtight boiling pot is simplified in configuration and save manufacturing costs due to reduction of manufacturing steps because the lid sealing means is disposed integrally with the container handle.

Furthermore, the handle-interlocking airtight boiling pot according to the preferred embodiment of the present invention does not need automatically air hole closing means which is mounted separately so as to be simplified in configuration and save manufacturing costs because the airtightly fixing part can airtightly fix the lid and close the air hole of the lid at the same time just by rotating the container handle toward the lid closing position.

Figure 1:
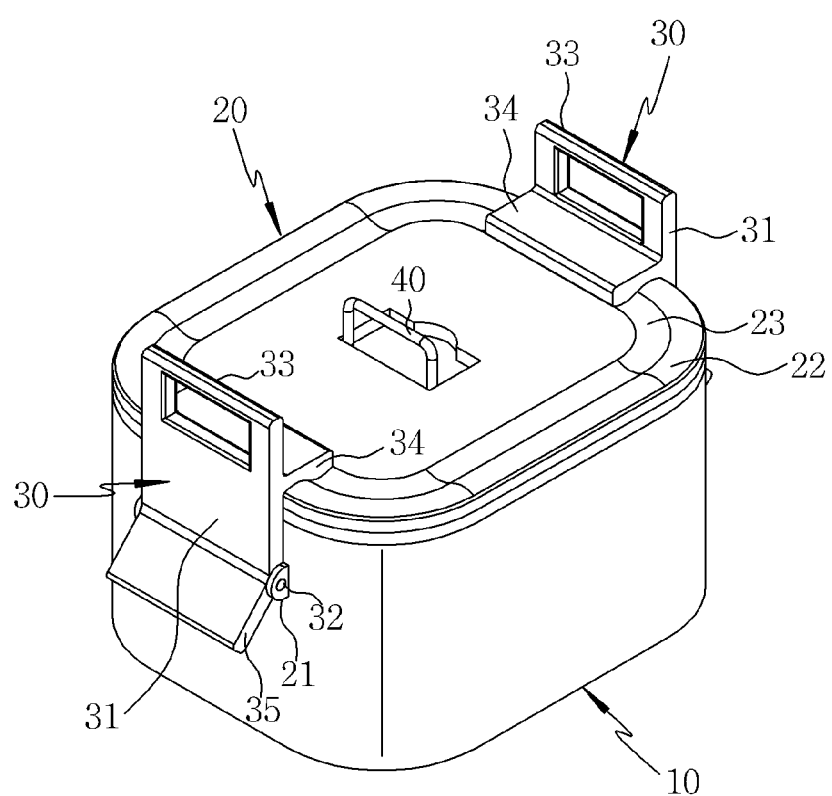
FIG. 1 is a perspective view showing a state of a lid of a handle-interlocking airtight boiling pot according to a preferred embodiment of the present invention is closed.

<Reference numerals of essential parts in drawings>

| | |
|---|---|
| 10: container | 20: lid |
| 22: retaining protrusion | 23: contact groove part |
| 25: air hole | 26: packing |
| 30: container handle | 31: rotational body |
| 33: hand grip part | 34: airtightly fixing part |
| 34a: retained surface | 34b: contact surface |
| 35: stopper part | 40: lid knob |

MODE FOR INVENTION

Reference will be now made in detail to a handle-interlocking airtight boiling pot according to a preferred embodiment of the present invention with reference to the attached drawings.

Figure 2:
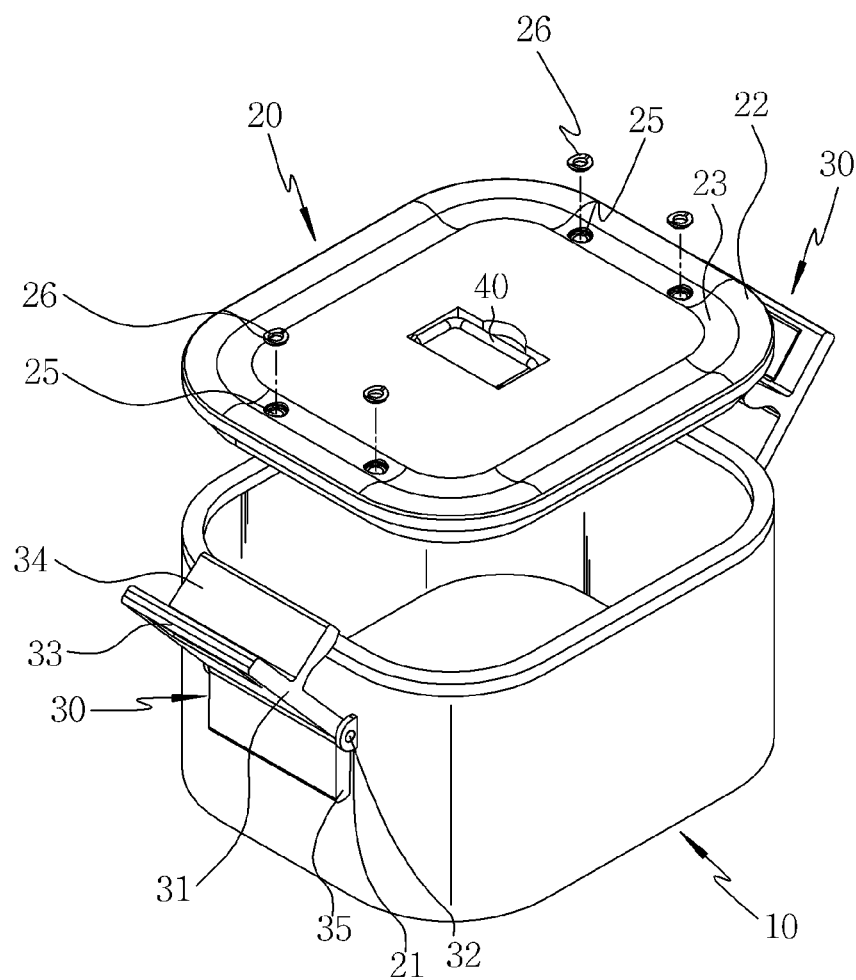
FIG. 2 is a perspective view showing a state of the lid of the handle-interlocking airtight boiling pot according to the preferred embodiment of the present invention is closed.

As shown in FIGS. 1 and 2, the handle-interlocking airtight boiling pot according to the preferred embodiment of the present invention is to cook food and includes a container 10 of which upper side is opened and a lid 20 for opening and closing an open part of the container 10.

Moreover, the handle-interlocking airtight boiling pot further includes: a container handle 30 disposed at both sides of the container 10 to allow a user to grip it with the hands to carry the pot; and a lid knob 40 disposed at the center of the lid 20 to allow the user to grip it with the hand to open and close the open part of the container 10.

The container handle 30 has lid sealing means formed integrally with the container handle 30 to airtightly fix the lid 20 to the container 10. The lid sealing means is configured to airtightly seal the container 10 with the lid 20 by moving the container handle 30 from a lid opening position (position of the container handle in FIG. 3) where a container handle 30 is separated laterally from the edge portion of the lid 20 to open the lid 20 toward a lid closing position (position of the container handle in FIG. 5) where the lid 20 is closely fixed to the container 10 by pressing an upper side of an edge portion of the lid 20.

Figure 3:
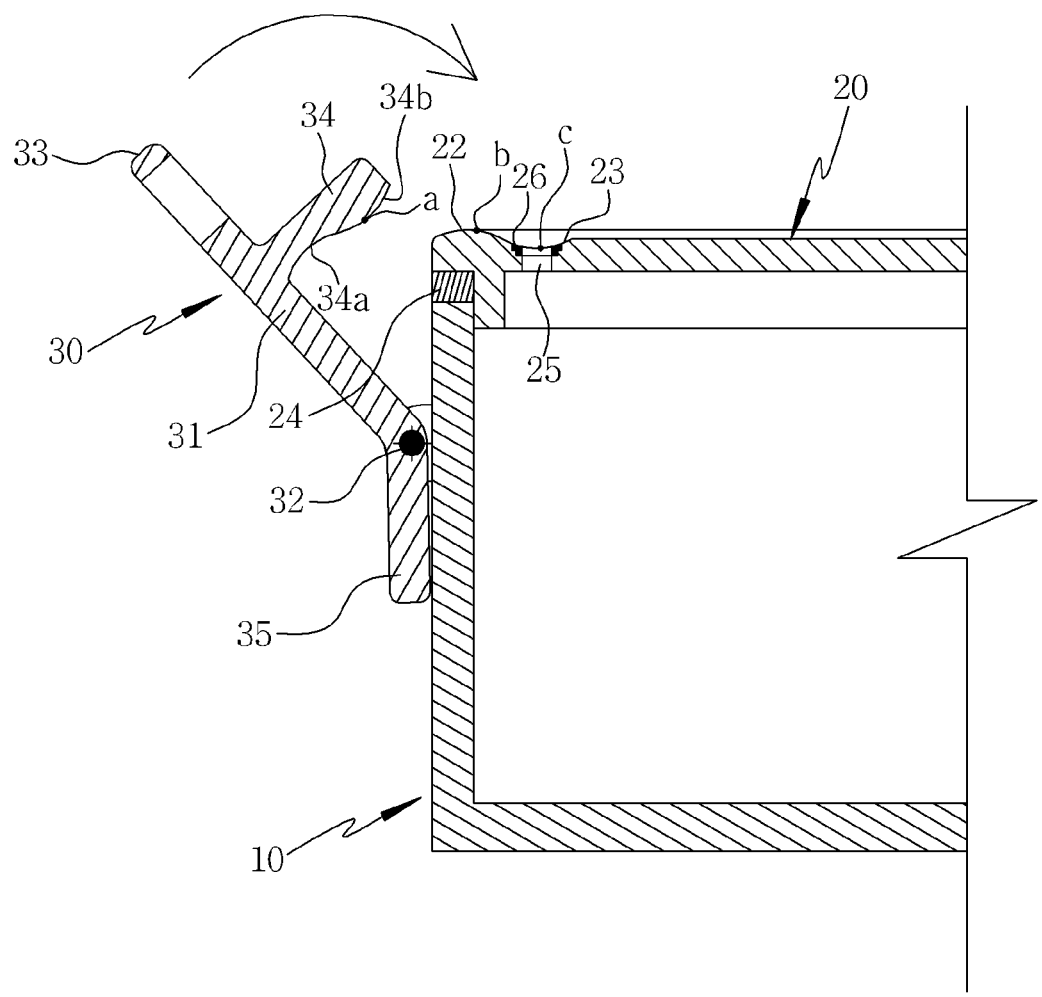
FIG. 3 is a sectional view of essential parts of the handle-interlocking airtight boiling pot, showing a used state of the handle-interlocking airtight boiling pot.
Figure 4:
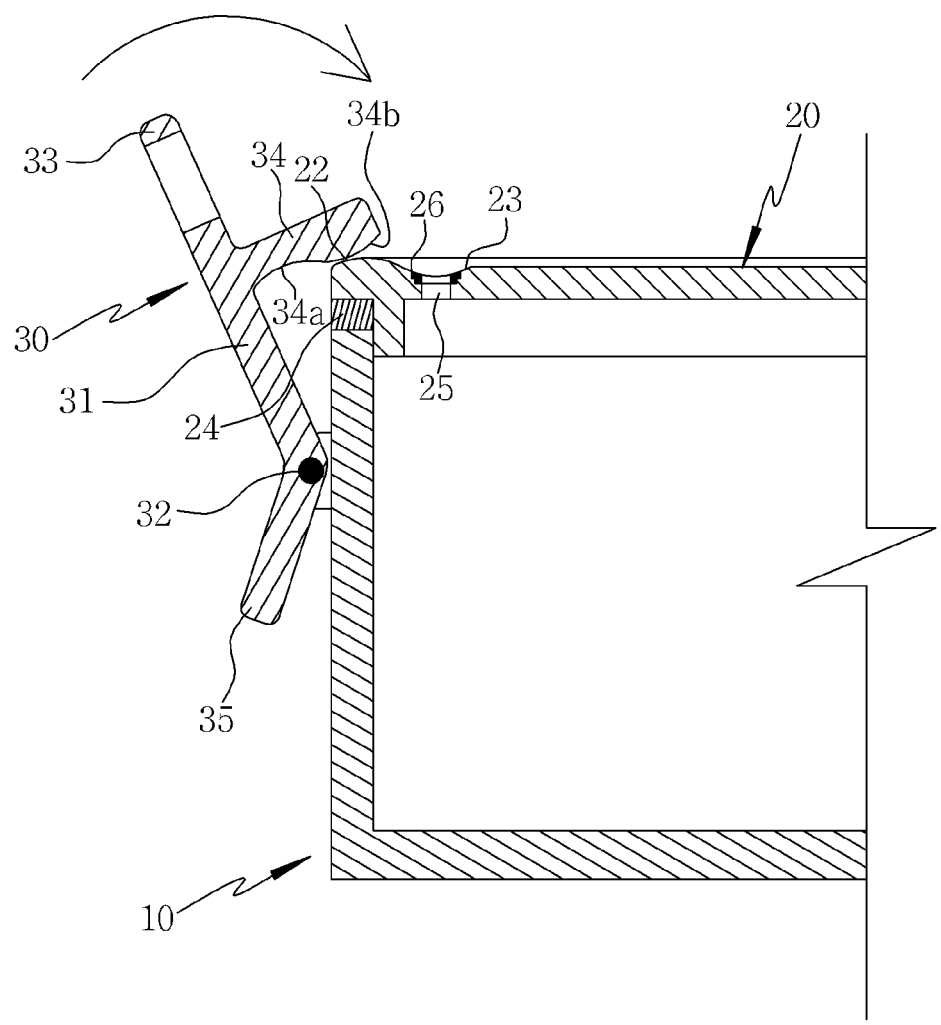
FIG. 4 is a sectional view of essential parts of the handle-interlocking airtight boiling pot, showing another used state of the handle-interlocking airtight boiling pot.
Figure 5:
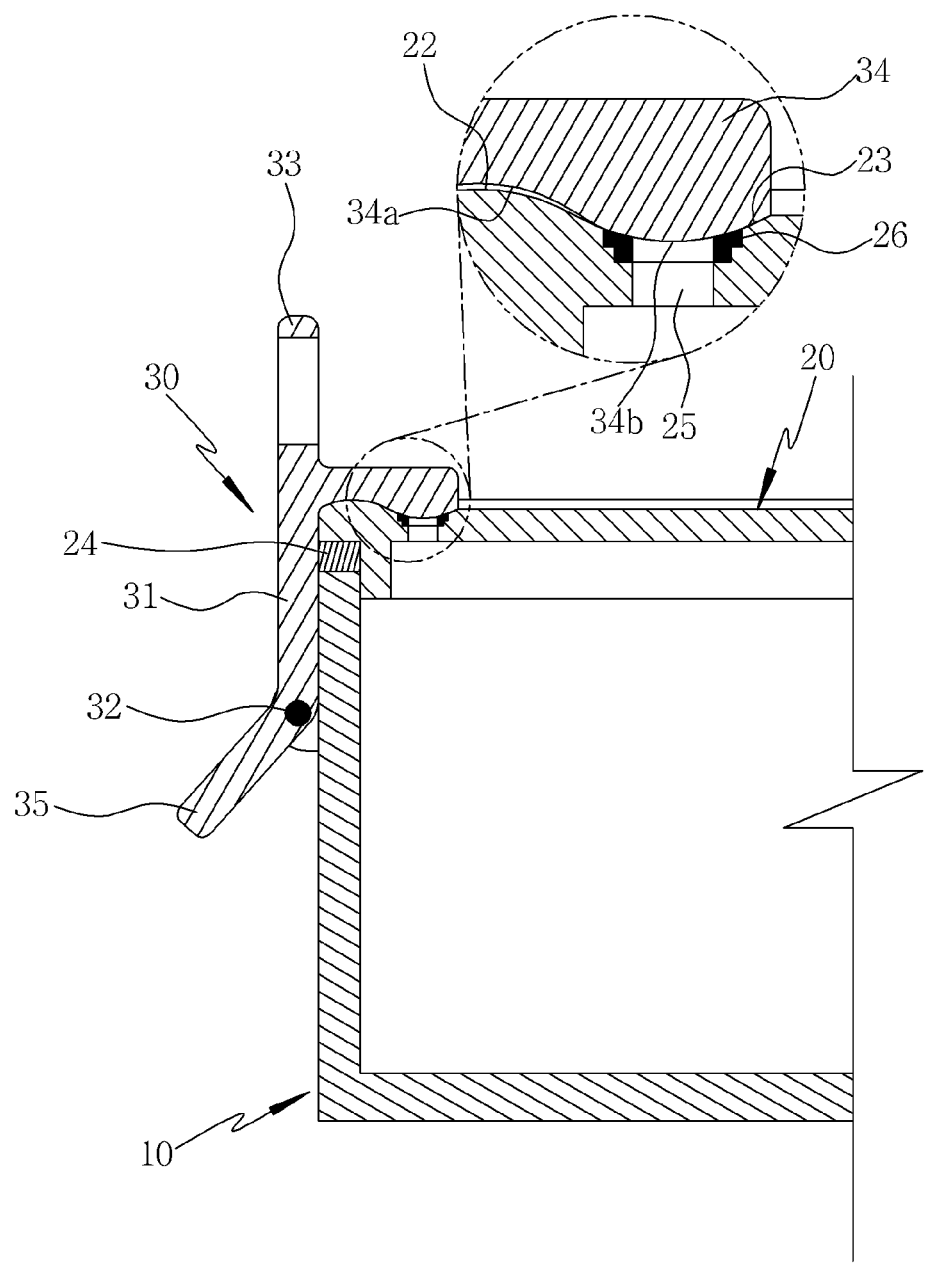
FIG. 5 is a sectional view of essential parts of the handle-interlocking airtight boiling pot, showing a further used state of the handle-interlocking airtight boiling pot.

That is, as shown in FIGS. 3 to 5, the container handle 30 has a rotational body 31 which is rotatably supported at the side of the container 10 and is mounted to rotate between the lid opening position and the lid closing position. The rotational body 31 which is rotatably supported, for instance, includes: a rotary shaft 32 formed integrally with the rotational body 31; and a rotation supporting boss 21 which is formed at the side of the container 10 and in which the rotary shaft 32 is inserted.

Furthermore, the rotational body 31 includes: a hand grip part 33 formed at an upper end thereof to allow the user to grip with the hand when he or she lifts and carries the pot; and an airtightly fixing part 34 which is formed integrally with a lower part of the hand grip part 33 and protrudes toward the lid 20 to airtightly fix the lid 20 to the container 10 by pressing an upper side of the lid 20 when the rotational body 31 is located at the lid closing position. On the upper side of the edge portion of the lid 20, the lid 20 includes a retaining protrusion 22 for catching and retaining the airtightly fixing part 34 of the rotational body 31 at the lid closing position and a contact groove part 23 with which the airtightly fixing part 34 gets in contact.

For this, as shown in FIG. 5, the retaining protrusion 22 and the contact groove part 23 of the lid 20 have a curved shape corresponding with the bottom surface of the airtightly fixing part 34. The bottom surface of the airtightly fixing part 34 includes a retained surface 34a which is caught and retained to the retaining protrusion 22 of the lid 20 and a contact surface 34b which comes into close contact with the contact groove part 23 of the lid 20.

In this instance, as shown in FIG. 3, a rotation track radius of a convex top position (a) of the contact surface 34b of the airtightly fixing part 34 which rotates on the rotary shaft 32 at the lid opening position is shorter than a distance between the rotary shaft 32 and a convex top position (b) of the retaining protrusion 22 and a distance between the rotary shaft 32 and a concave bottom position (c) of the contact groove part 23 and is formed to pass the convex top position while elastically transforming the airtightly fixing part when the user applies power to the hand grip part 33 a little and to make the airtightly fixing part 34 press the lid 20 at the lid closing position to airtightly fix as shown in FIG. 5. The lid 20 has a packing 24 for keeping airtightness between the container 10 and the lid 20.

Additionally, the rotational body 31 further includes a stopper part 35 which is formed integrally with a lower part thereof and extends downwardly. As shown in FIG. 3, the stopper part 35 gets in contact with the side of the container 10 when the rotational body 31 is located at the lid opening position to restrict the lid opening position of the rotational body 31, and is to minimize a rotating distance between the lid closing position and the lid opening position when an angle bent from the rotational body 31 is set.

Referring to FIG. 2, the lid 20 has an air hole 25 formed in the contact groove part 23 of the lid 20 of with which the contact surface 34b of the airtightly fixing part 34 of the rotational body 31 gets in contact at the lid closing position, and the air hole 25 is open into the inside of the container 10. The air hole 25 is closed at the lid closing position and opened at the lid opening position by the contact surface 34b of the airtightly fixing part 34.

In this embodiment, there are two air holes 25, but the present invention is not restricted to the above, and one or three air holes 25 may be formed.

In addition, it is preferable that another packing 26 is disposed at an upper end of the air hole 25 of the container 10 to maintain airtightness when the packing 26 gets in contact with the contact surface 34b of the airtightly fixing part 34 of the rotational body 31. In this embodiment, the packing 26 is disposed at the air hole 25 but may be disposed at the contact surface 34b.

Now, functions of the handle-interlocking airtight boiling pot according to the preferred embodiment of the present invention will be described as follows. First, as shown in FIG. 3, when the rotational body 31 of the container handle 30 is located at the lid opening position, the lid 20 can be opened and closed relative to the container 10 and the user can put food in the container 10 to heat and cook the food. Moreover, in a case that steam pressure is generated inside the container 10 due to heating during cooking, because the air hole 25 formed in the lid 20 is opened, steam pressure is discharged out through the air hole 25, and it prevents opening of the lid 20 or generation of noise by steam pressure.

Continuously, in order to store cooked food in the pot, as shown in FIGS. 3 to 5, when the rotational body 31 of the container handle 30 is rotated from the lid opening position to the lid closing position, the contact surface 34b of the airtightly fixing part 34 which is formed integrally with the rotational body 31 comes into contact with the contact groove part 23 of the lid 20, and then, the lid 20 comes into contact with the container 10. The retained surface 34a of the airtightly fixing part 34 is retained to the retaining protrusion 22 of the lid 20 so as to maintain a fixed state of the lid 20, and the packing 24 located between the container 10 and the lid 20 is compressed by pressure of the lid 20 so as to more firmly maintain airtightness between the container 10 and the lid 20.

Furthermore, the contact surface 34b of the airtightly fixing part 34 presses the lid 20 to get in contact with the container 10, and at the same time, closes the air hole 25 formed in the contact groove part 23 of the lid 20, so that the handle-interlocking airtight boiling pot can prevent the inside air of the container 10 from being discharged out through the air hole 25 to prevent food from being spoiled by the outside air introduced into the container 10 through the air hole 25 or to prevent food smells from being discharged out through the air hole 25 when the pot which contains food is stored in a refrigerator. In this instance, because the air hole 25 has the packing 26 and the contact surface 34b of the airtightly fixing part 34 gets in contact with an upper side of the packing 26, it can more firmly maintain airtightness of the air hole 25.

As described above, because the lid sealing means for airtightly fix the lid 20 to the container 10 to seal the container is formed integrally with the container handle 30 and the lid 20 is airtightly sealed just by the action to rotate the container handle 30 from the lid opening position to the lid closing position, the handle-interlocking airtight boiling pot is very convenient in use and can remarkably simplify the configuration of the pot.

Moreover, because the airtightly fixing part 34 formed integrally with the container handle 30 for airtightly sealing the lid 20 carries out the function to open and close the air hole 25 formed in the lid 20, the handle-interlocking airtight boiling pot is very convenient in use and can remarkably simplify the configuration of the pot.

While the present invention has been particularly shown and described with reference to preferred embodiments thereof, the technical scope of the present invention is not to be restricted by the embodiments. It will be understood by those of ordinary skill in the art that various changes, modifications and equivalences may be made therein without departing from the technical idea and scope of the present invention and such changes, modifications and equivalences belong to the claims of the present invention.

The invention claimed is:

1. A handle-interlocking airtight boiling pot which includes:
    a container having an upper part which is opened;
    a lid for opening and closing the upper part of the container;
    container handles disposed at both sides of the container; and
    a lid knob disposed at the lid,
    wherein each of the container handles includes:
    a rotational body which is rotatably supported at a lateral side of the container and which is mounted so as to rotate between a lid opening position and a lid closing position;
    a hand grip part disposed at an upper end of the rotational body; and
    an airtightly fixing part integrated with a lower part of the hand grip part and protruding toward the lid to airtightly fix the lid to the container by pressing an upper side of the lid when the rotational body is located at the lid closing position,
    wherein the lid includes:
    a retaining protrusion disposed at an upper side of an edge portion of the lid to catch and retain the airtightly fixing part of the rotational body at the lid closing position; and
    a contact groove part with which a contact surface of the airtightly fixing part contacts, and
    wherein an air hole, through which air inside the container is vented, is in the contact groove part of the lid, and the air hole is closed by the contact surface of the airtightly fixing part of the rotational body at the lid closing position.

2. The handle-interlocking airtight boiling pot according to claim 1, further including: a stopper part integrated with a lower part of the rotational body to restrict the lid opening position of the rotational body by contacting with the side of the container at the lid opening position.

3. The handle-interlocking airtight boiling pot according to claim 1, wherein a packing which contacts with the contact surface of the airtightly fixing part is mounted at an upper end of the air hole of the lid.

4. The handle-interlocking airtight boiling pot according to claim 2, wherein a packing which contacts with the contact surface of the airtightly fixing part is mounted at an upper end of the air hole of the lid.

* * * * *